US011086846B2

(12) United States Patent
Neginhal et al.

(10) Patent No.: US 11,086,846 B2
(45) Date of Patent: Aug. 10, 2021

(54) GROUP MEMBERSHIP AND LEADER ELECTION COORDINATION FOR DISTRIBUTED APPLICATIONS USING A CONSISTENT DATABASE

(71) Applicant: VMware, Inc., Palo Alto, CA (US)

(72) Inventors: Srinivas Neginhal, Belmont, CA (US); Medhavi Dhawan, Cupertino, CA (US); Vjekoslav Brajkovic, Mountain View, CA (US); Cheng Zhang, Palo Alto, CA (US); Jiaqi Chen, Santa Clara, CA (US); Ragnar Edholm, Sunnyvale, CA (US); Rajneesh Bajpai, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 315 days.

(21) Appl. No.: 16/255,780

(22) Filed: Jan. 23, 2019

(65) Prior Publication Data
US 2020/0233853 A1  Jul. 23, 2020

(51) Int. Cl.
| | | |
|---|---|---|
| *G06F 16/00* | (2019.01) | |
| *G06F 16/23* | (2019.01) | |
| *G06F 16/245* | (2019.01) | |
| *G06F 16/27* | (2019.01) | |
| *G06F 16/22* | (2019.01) | |

(52) U.S. Cl.
CPC ...... *G06F 16/2365* (2019.01); *G06F 16/2282* (2019.01); *G06F 16/245* (2019.01); *G06F 16/27* (2019.01)

(58) Field of Classification Search
CPC .... G06F 16/2365; G06F 16/245; G06F 16/27; G06F 16/2282
See application file for complete search history.

(56) References Cited

U.S. PATENT DOCUMENTS

| | | | |
|---|---|---|---|
| 8,352,450 B1* | 1/2013 | Mraz | G06F 16/273 707/705 |
| 9,569,513 B1* | 2/2017 | Vig | G06F 16/24565 |
| 2007/0220375 A1* | 9/2007 | Baz | G06F 11/302 714/55 |
| 2013/0013723 A1* | 1/2013 | Deshmukh | G06F 11/076 709/208 |
| 2013/0132958 A1* | 5/2013 | Jain | G06F 9/52 718/100 |
| 2015/0127625 A1 | 5/2015 | Bulkowski et al. | |

(Continued)

*Primary Examiner* — Alexander Khong
(74) *Attorney, Agent, or Firm* — Patterson + Sheridan, LLP

(57) ABSTRACT

Certain aspects described herein are directed to methods and systems for updating a status of a first process. In certain aspects, a method includes periodically examining a first table stored in a consistent and distributed database, wherein the table includes a first indication of a status of the first process and a second indication of a status of a second process and the first process and the second process are clustered for implementing functions of a distributed application in a distributed manner. The method further includes determining that the first indication has not changed during a first time period and changing the status of the first process in a second table to reflect that the first process is non-operational, wherein a different share of workload associated with the distributed application is performed by the second process as compared to when the first process was operational.

19 Claims, 11 Drawing Sheets

(56) References Cited

U.S. PATENT DOCUMENTS

| | | | |
|---|---|---|---|
| 2016/0034490 A1* | 2/2016 | Woo | G06F 16/178 |
| | | | 707/634 |
| 2017/0262519 A1* | 9/2017 | Horowitz | G06F 11/0709 |
| 2017/0262638 A1 | 9/2017 | Horowitz et al. | |
| 2019/0278749 A1* | 9/2019 | Yoakley | G06F 16/119 |
| 2019/0334765 A1 | 10/2019 | Jain et al. | |
| 2020/0125662 A1* | 4/2020 | Zhu | H04L 41/0816 |
| 2020/0205055 A1* | 6/2020 | Snodgrass | H04L 45/745 |
| 2020/0233689 A1 | 7/2020 | Neginhal et al. | |

\* cited by examiner

Group Directory Table 510

| Group Identifier | Group Name |
|---|---|
| Group UUID 1 | MP Group |
| Group UUID 2 | Controller Group |
| ... | ... |

Group Membership Table 520

| Member Identifier | Member Name | Status |
|---|---|---|
| Member UUID 1 | FQDN 1 | UP |
| Member UUID 2 | FQDN 2 | UP |
| | | |

Heartbeat Table 530

| Member Identifier | Heartbeat Version | Heartbeat Count |
|---|---|---|
| Member UUID 1 | 1 | 5 |
| | | |
| | | |

Fig. 5

Group Directory Table 510

| Group Identifier | Group Name |
| --- | --- |
| Group UUID 1 | MP Group |
| Group UUID 2 | Controller Group |
| ... | ... |

Group Membership Table 520

| Member Identifier | Member Name | Status |
| --- | --- | --- |
| Member UUID 1 | MP 241a | DOWN |
| Member UUID 2 | MP 241b | UP |
|  |  |  |

Heartbeat Table 530

| Member Identifier | Heartbeat Version | Heartbeat Count |
| --- | --- | --- |
| Member UUID 1 | 1 | 5 |
| Member UUID 2 | 1 | 2 |
|  |  |  |

Fig. 7

Lease Table 810

| Service Name | Leader Identifier | Lease Version | Revocation Count |
|---|---|---|---|
| Service 1 | Member UUID 1 | 0 | 0 |
| ... | ... | ... | ... |

Fig. 8

GROUP MEMBERSHIP AND LEADER ELECTION COORDINATION FOR DISTRIBUTED APPLICATIONS USING A CONSISTENT DATABASE

BACKGROUND

Software defined networking (SDN) comprises a plurality of hosts in communication over a physical network infrastructure, each host having one or more virtualized endpoints such as virtual machines (VMs) or containers that are connected to logical overlay networks that may span multiple hosts and are decoupled from the underlying physical network infrastructure. SDN involves the use of a management plane and a control plane. The management plane is concerned with receiving network configuration input from an administrator and generating desired state data that specifies how the logical network should be implemented in the physical infrastructure. The management plane may have access to a database for storing the network configuration input. The control plane is concerned with determining the logical overlay network topology and maintaining information about network entities such as logical switches, logical routers, and endpoints, etc. The logical topology information is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host.

Typically, the management plane, control plane, and database operate as distributed applications or components to allow for fault tolerance and high availability. A distributed application refers to a software application or program that is executed on multiple computing devices (e.g., physical computing devices, virtualized endpoints, etc.) within a system or network. For example, a number of different management processes, each executing on a different computing device, may implement the functions of the management plane. In such an example, the different processes are clustered such that they are able to recognize each other, share workloads, and operate together as a single management plane. Clustering processes of one or more distributed applications, such that each process is able to efficiently share its status and also determine the status of other corresponding processes, however, is a challenge.

BRIEF DESCRIPTION OF THE DRAWINGS

FIG. 5 illustrates example group directory, group membership, and heartbeat tables corresponding to the operations of FIG. 4, according to certain aspects described herein.

FIG. 7 illustrates example group directory, group membership, and heartbeat tables corresponding to the operations of FIG. 6, according to certain aspects described herein.

FIG. 8 illustrates an example lease table, according to certain aspects described herein.

DETAILED DESCRIPTION

Aspects presented herein relate to systems and methods for providing group membership and leader election coordination to clustered distributed applications using a consistent database.

Figure 1:
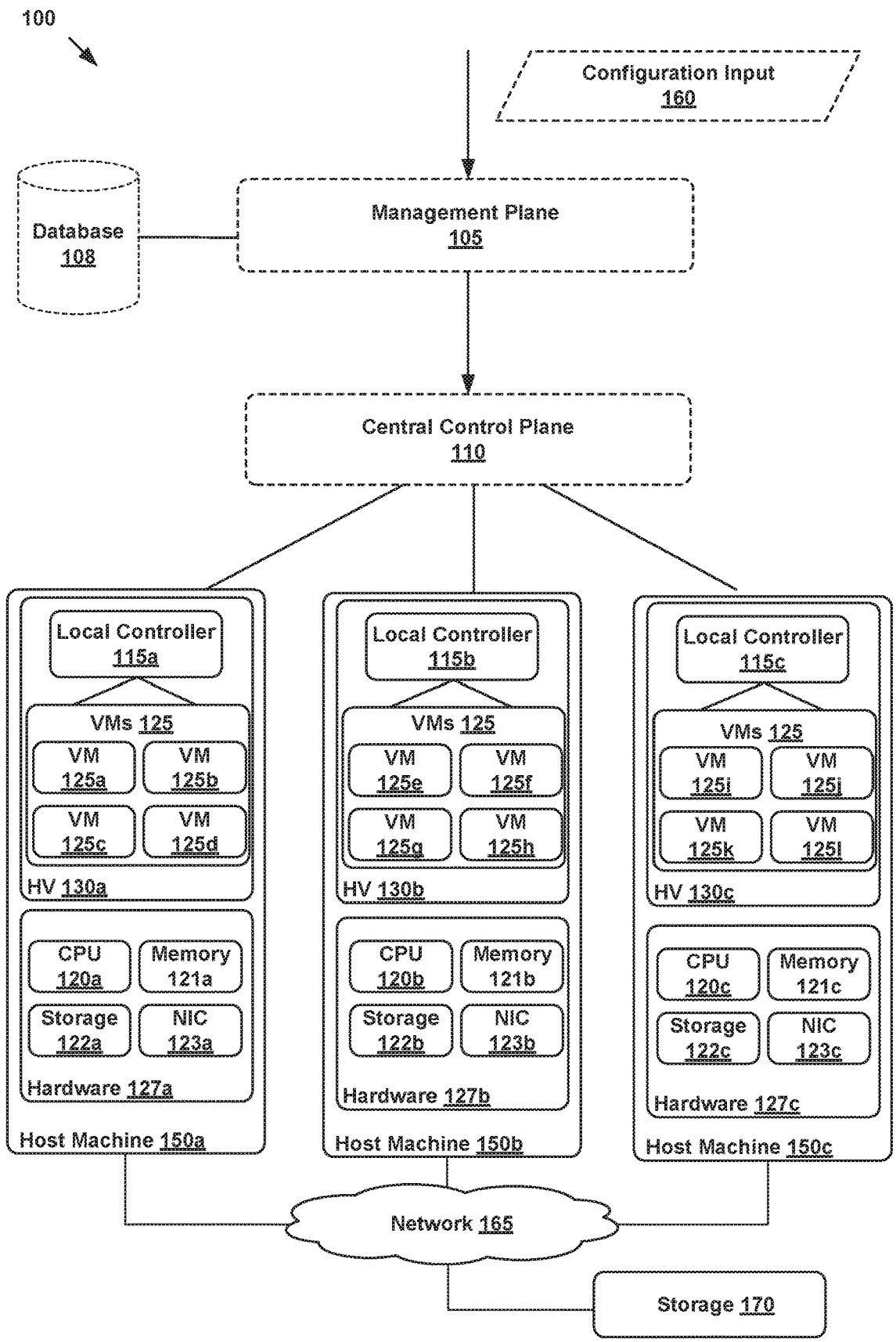
FIG. 1 illustrates an example block diagram of a network control system for a virtual network, according to one example aspect.

FIG. 1 is a block diagram of a network control system 100 including a management plane 105, a central control plane (CCP) 110, a database 108 and multiple local controllers (also called the local control plane (LCP)) 115*a*, 115*b*, and 115*c* that operate on host machines ("hosts") 150*a*, 150*b*, and 150*c*, respectively, which are physical computing devices that support the execution of virtual machines (VMs) 125*a*-125*l* (collectively referred to as VMs 125 and individually referred to as VM 125). Although certain aspects herein are described with respect to VMs, it should be noted that the same techniques may be applied to other types of VCIs. The term "VCI" may refer to VMs, containers, Docker containers, data compute nodes, isolated user space instances, namespace containers, and the like. In addition, the same techniques may also be used by or implemented in relation to physical computing devices.

Hosts 150*a*-150*c* (collectively referred to as hosts 150 and individually referred to as host 150) are typically on server grade hardware platforms ("hardware"), such as hardware 127*a*-127*c*, respectively. An example of a server grade hardware platform is the x86 architecture platform. Hosts 150*a*-150*c* may be geographically co-located servers on the same rack or on different racks in any location within a data center. Each of hosts 150*a*-150*c* is configured with a virtualization layer, referred to herein as a hypervisor (also referred to as HV). Each of hypervisors 130*a*-130*c* abstracts processor, memory, storage, and networking resources of a corresponding hardware platform 127*a*-127*c* into multiple virtual machines 125. VMs 125 on the same host 150 may use any suitable overlaying guest operating system(s) and run concurrently with the other VMs 125.

Hypervisor 130 architecture may vary. In some aspects, hypervisor 130 is installed as system level software directly on the hosts 150 (often referred to as a "bare metal" installation) and conceptually interposed between the physical hardware and the guest operating systems executing in VMs 125. Alternatively, hypervisor 130 may conceptually run "on top of" a conventional host operating system in the server. In some implementations, hypervisor 130 may comprise system level software as well as a privileged VM machine (not shown) that has access to the physical hardware resources of the host 150. In such implementations, a virtual switch, virtual tunnel endpoint (VTEP), etc., along with hardware drivers, may reside in the privileged VM.

Hardware platform 127 of each host 150 includes components of a computing device such as one or more processors (CPUs) 120, a system memory 121, a storage system 122, a network interface (referred to in FIG. 1 as "NI") 123, a host bus adapter (HBA) (not shown), and other I/O devices such as, for example, a mouse and keyboard (not shown). Processor 120 is configured to execute instructions such as executable instructions that perform one or more operations described herein. The executable instructions may be stored in memory 121 and in storage system 122. Network interface 123 enables host 150 to communicate with other devices via a communication medium, such as network 165. Network interface 123 may include one or more network adapters or ports, also referred to as Network Interface Cards (NICs), for connecting to one or more physical networks. Network 165 may be a local area network ("LAN"), a wide area network ("WAN"), or a network of networks, such as the Internet.

Memory 121 is hardware for allowing information, such as executable instructions, configurations, and other data, to be stored and retrieved. Memory 121 is where programs and data are kept when processor 120 is actively using them. Memory 121 may be volatile memory or non-volatile memory. The HBA of a host 150 couples the host to one or more external storages, such as storage 170, which may be a storage area network (SAN) or a distributed virtual SAN. Other external storages that may be used include a network-attached storage (NAS) and other network data storage systems, which may be accessible via network interface 123. Storage system 122 represents persistent storage device(s). Storage 122 may be one or more hard disks, flash memory modules, solid state disks, and/or optical disks. Data on storage disks of storage 122 may be organized into blocks, and each block on storage system 122 may be addressable. Although storage 122 is shown as being local to host 105, storage 122 may be external to host 150, such as by connection via the host 150's HBA. In addition, storage systems 122a-122c may be used as part of a storage virtualization platform, such as virtual SAN (VSAN).

Hypervisors 130a-130c abstract processor, memory, storage, and/or networking resources of hosts 150a-150c, respectively, into multiple VMs 125a-125l, 125e-12h, and 125i-125l that can run side-by-side on the same hosts 150a-150c. That is, the virtualization software partitions physical hosts 150a-150c into multiple secure and portable VMs 125. Each VM 125 may represent a complete virtual system—with virtual processors, virtual memory, virtual networking interface, virtual disk storage, and its own BIOS. For example, each VM 125 comprises a software-based virtual network adaptor (not shown), also referred to as a virtual network interface card (VNIC) that is logically connected to instantiations of the control plane (e.g., local controllers 115a-115c) running on host machines 150a-150c and provides network access for the VM 125. Each VM 125's VNIC is typically connected to a corresponding controller 115 through a virtual switch.

A shown, network control system 100 also includes database 108, management plane 105, central control plane (CCP) 110, which are representations of SDN software applications or components that are configured to be used for implementing one or more logical network topologies for connecting a number of endpoints, such as VM 125, within network control system 100. Though shown as single entities, as further described in relation to FIG. 2, it should be understood that database 108, management plane 105, and CCP 110 may be implemented as distributed or clustered applications or components. For example, management plane 105 may include multiple computing devices that implement management plane functions, and a CCP 110 may include multiple central (or distributed) controller computers, virtual machines, containers, or processes that implement CCP functions. An example of a computing device may include a VM 125 executing on a host 150. In such an example, multiple VMs 125 running on the same or different hosts 150 may implement management and/or control plane functions.

In certain aspects, management plane 105 is responsible for receiving network configuration input 160 through an interface (e.g., an application programming interface or user interface). For example, users (e.g., network administrators) may input network configuration data through a user interface such as a command-line interface or graphical user interface. Network configuration input may, for example, comprise configuration data indicative of how multiple endpoints, such as VM 125, running on different hosts 150 may be connected through a logical Layer-2 or overlay network. More specifically, in certain aspects, each logical network configuration for each logical network includes data defining one or more endpoints and the connections between the endpoints. For example, network configuration input 160 may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules) to be enforced at one or more logical networking elements, etc. Management plane 105 may be configured to store network configuration input 160 in a database 108 that is stored in storage (e.g., storages 122a-122c and 170, etc.). In the aspects described herein, database 108 is a distributed database in that different replicas or instances of database 108 are stored in multiple different data stores, such as storages 122a-122c and 170, in a distributed manner. Each instance of database 108 is structured and managed by a corresponding instance of a distributed database server (DBS). A DBS refers to a software program or process that is primarily configured to structure and manage a database. Managing a database, for example, includes entering and retrieving information from the database. In addition to being distributed, database 108 described herein is also strongly consistent. In other words, a write operation to any one instance of database 108 is applied to all instances of database 108. As a result of this, a read operation to any instance of database 108 retrieves the same data at all times.

Based on network configuration input 160, management plane 105 generates desired state data that specifies how the logical network should be implemented in the physical infrastructure. CCP 110 then updates/implements the logical network based on the desired state information through local controllers 115. For example, CCP 110 is responsible for managing and maintaining information about virtual machines, virtual switches, virtual routers, etc. implemented on host machines. Further, CCP 110 is responsible for configuring physical network elements implemented by host machines 150a-150c to ensure that the defined logical network topologies and policies are properly implemented. When users provide configuration changes (e.g., creating or deleting logical entities, modifying properties of logical entities, changing relationships between logical entities, etc.), the changes to the desired state are distributed as updates to CCP 110. Local controllers 115 are responsible for translating data received from CCP 110 into configuration data formatted for their respective VMs 125. In some aspects, the local controller is a daemon that operates in the virtualization software of the host machine.

Figure 2:
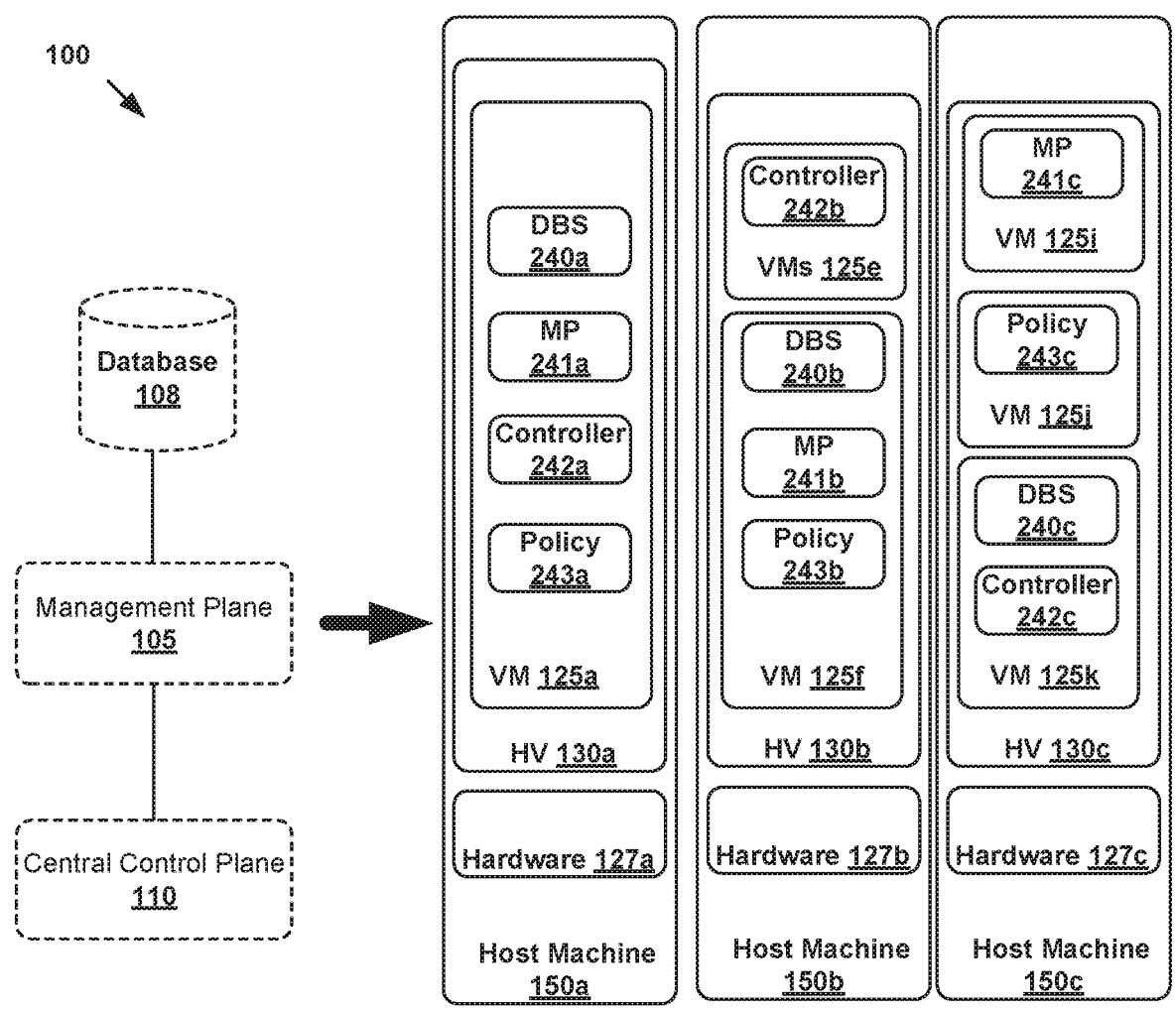
FIG. 2 illustrates an example block diagram of a network control system including a database, a management plane, and a central control plane, according to one example aspect.

FIG. 2 illustrates an example block diagram of a network control system 100 including database 108, management plane 105, and CCP 110, each of which is a distributed application or component in the example of FIG. 2. More specifically, two or more processes running on different VMs 125, on the same or different hosts 150, may implement the functionality of each of the applications or components associated with network control system 100. For example, FIG. 2 shows DBS 240a, DBS 240b, and DBS 240c running on VM 125a of host 150a, VM 125f of host 150b, and VM 125k of host 150c, respectively. Each DBS 240 is an instance of a distributed DBS and is configured to structure and manage a corresponding instance of database 108. Management processes (MPs) 241a, MP 241b, and MP 241c run on VM 125a, VM 125f, and VM 125i, respectively, to implement the functions of management plane 105. Similarly, controller process (controller) 242a, controller 242b, and controller 242c run on VM 125a, VM 125e, and VM 125k, respectively, to implement the functions of CCP 110.

Note that processes may be executed separately by separate VMs or together in one VM. For example, VM 125a runs multiple processes, DBS 240a, MP 241a, controller 242a, and policy 243a, associated with different distributed applications. In certain cases, VM 125a may be referred to as a unified appliance. On the other hand, VM 125e, which may be referred to a controller VM, only runs a controller 242b. Also, VM 125f, which may be referred to as a manager VM, runs DBS 240b, MP 241b, and policy 243b. As shown, one or more of the processes may also be executed separately by different VMs, such as VM 125e, which only executes controller 242b, and VM 125i, which only executes MP 241c, etc. One of ordinary skill in the art recognizes that FIG. 2 only illustrates one example of how database 108, MP 105, and CCP 110 can be stored or executed in a distributed manner. Note that policies 243 refer to processes associated with a distributed policy application (not shown). In one example, the distributed policy application is configured to provide a graphical user interface (GUI) to a user to allow the user to specify the user's intent with respect to networking, security, and availability configurations of network control system 100. Once the user inputs the user-intent, the distributed policy application then configures management plane 105 to realize the user-intent.

With a distributed application, each of the multiple processes that implement the functions of the application is configured with the same logic. In other words, any of the multiple processes of a distributed application is capable of handling workload associated with the application. Therefore, workload is typically divided among the multiple processes. The sharing of workload in such a distributed manner provides many advantages, including fault tolerance. For example, if an underlying computing device associated with one of the multiple processes of a distributed application fails, the distributed application still functions because the other processes on other computing devices are still operating. To illustrate this with an example, in the case of management plane 105 in FIG. 2, if VM 125a fails, thereby, rendering MP 241a unavailable, management plane 105 would still function because MP 241b and 241c are still operating.

In order for an application to operate in a distributed manner, it is important that each of the corresponding processes is able to identify the other processes that are part of the same cluster or group for implementing the functions of the application. In addition, it is important for each of the processes in a cluster to announce its operational status to the other processes while also being able to determine the status of the other processes for workload distribution purposes. As an example, if MP 241a, MP 241b, and MP 241c are grouped together to implement the functions of management plane 105, it is important that each one of MPs 241 is able to determine that it is part of a group for sharing workload associated with management plane 105 and also identify the other MPs 241 in the group. In addition, allowing each of MPs 241 to determine the status of the other MPs 241 is advantageous because if, for example, MP 241a fails, MPs 241b and 241c would be able to determine that MP 241a is no longer available to handle any workload. In that case, MPs 241b and 241c may start sharing all the workload associated with management plane 105 until MP 241a becomes available again.

Also, in some cases, certain tasks associated with a distributed application may be allowed to be performed by only one of the corresponding processes that are part of the group. In such cases, it is important to the necessary coordination for one of the corresponding processes to act as a leader for performing one of such mutually exclusive tasks. It is also advantageous to allow other processes of the group to determine which process has taken a leadership position with respect to a task (i.e., is the leader) and whether the leader has held the leadership beyond a defined period.

Clustering processes of one or more distributed applications, such that the processes are enabled with the capabilities described above, however, is a challenge. Accordingly, certain aspects described herein relate to systems and methods for configuring clusters of processes that are able to operate in a distributed manner by providing group membership and leader election coordination to the clustered processes using a strongly consistent database.

The aspects described herein provide a cluster manager ("CM") that is configured as a distributed application or software program for configuring and managing clusters within a system, such as network control system 100 of FIG. 2. The CM is configured to enable processes associated with one or more distributed applications to operate in a distributed manner. Each CM is also configured with a fault detector module that monitors and updates the statue of clustered processes in network control system 100.

In certain aspects, the CM is installed on each VM 125 that is instantiated by, for example, an administrator to be a part of a clustered system, such as network control system 100. When a new VM 125 is instantiated, its corresponding CM performs cluster configuration operations for clustering the VM and its processes. For example, when a first VM 125 is instantiated, its corresponding CM creates a one-VM cluster that includes the first VM 125 and its processes. Subsequently, additional VMs 125 may be added to the one-VM cluster, thereby, creating a two-VM-cluster, a three-VM-cluster, and so on.

In addition to a CM, certain aspects herein provide a group membership and leader election software program or module (GMLE). GMLE is provided in the form of two different interfaces, a group administration interface (GAI) and a group membership interface (GMI). Each fault detector module executing within a CM is configured with a GAI that enables the CM to create, remove, configure, and monitor clusters or groups of processes (e.g., processes 335a, 335b, etc.) as well as add and remove processes and from groups, etc. A CM can perform any of these operations by calling or executing a corresponding function provided by the GAI. In addition, each of the processes associated with a distributed application is configured to execute a GMI that enables the process to join and leave a group of processes, provide updates of its status, identify the leader of a certain service or task, request and relinquish leadership of a certain service, etc. A process can perform any of these operations by calling a corresponding function provided by a corresponding GMI.

Note that certain aspects herein describe cluster configuration operations performed by CMs for clustering VMs and processes of network control system 100 shown in FIGS. 1 and 2. However, CMs, as described herein, may be used for clustering any type of computing device, apparatus, or node (e.g., virtual or physical) in any type of system. In other words, as further described in relation to FIGS. 10-11, the cluster configuration operations performed by CMs are decoupled from and not dependent on the type of node, processes, or system. Note that a virtual node may be any type of VCI.

Figure 3:
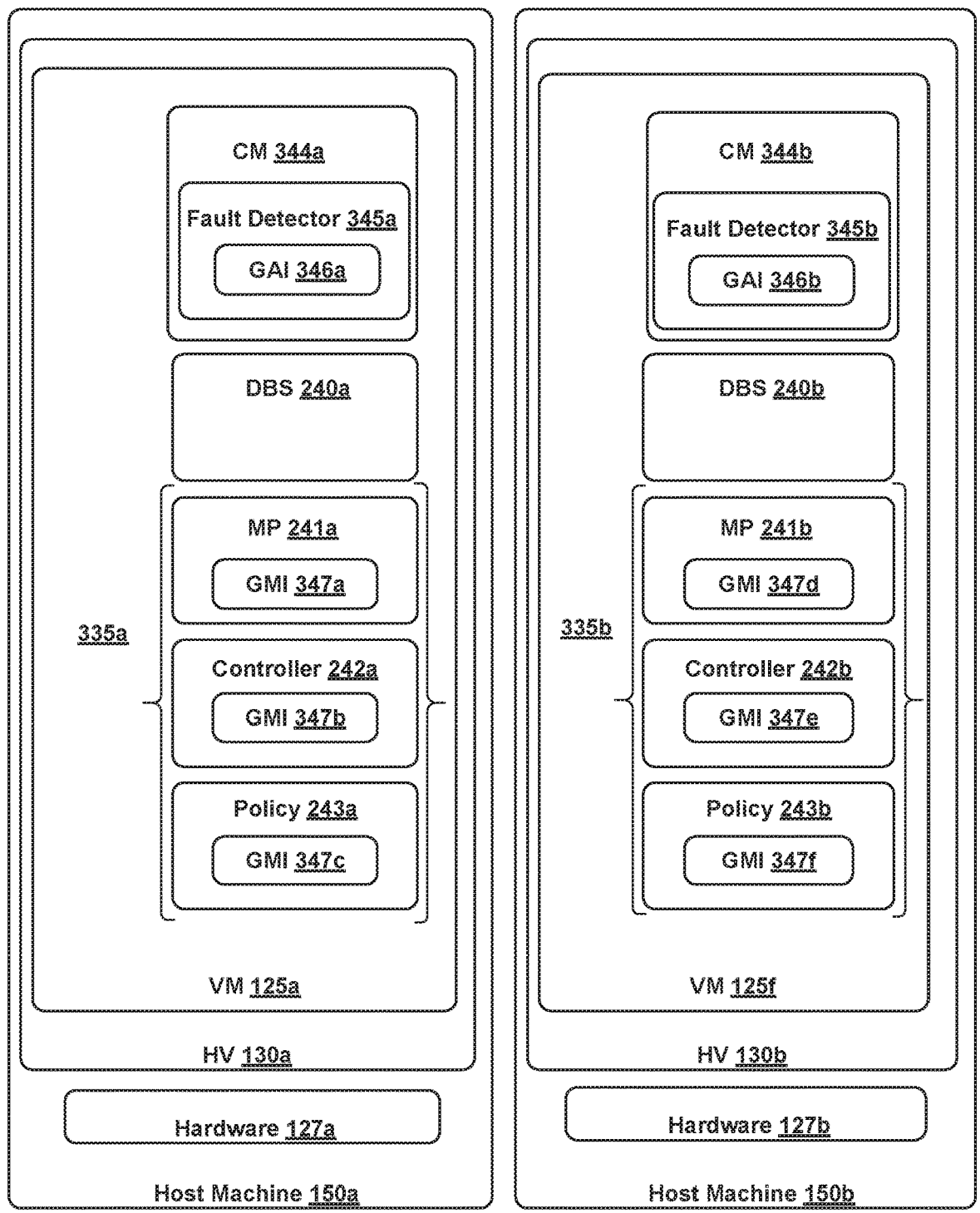
FIG. 3 illustrates two exemplary virtual machines (VM) that are each configured with a cluster manager (CM) having a group administration interface (GAI), according to certain aspects described herein.

FIG. 3 illustrates VM 125a and VM 125f of FIG. 1 that are each configured with a CM 344. CM 344a is a daemon process that runs on VM 125a, which is configured with DBS 240a as well as a number of processes 335a, including MP 241a, controller 242a, and policy 243a. Similarly, CM 344b runs on VM 125b, which is configured with DBS 240b as well as a number of processes 335b, including MP 241b, controller 242b, and policy 243b. As shown, each CM 344 is configured with a fault detector 345, which comprises a GAI 346. Fault detectors 345 are configured to determine and update the status of clustered processes 335, as further described below. Also, as further shown, each one of processes 335 is configured with GMI 347, which provides group membership and leader election services to the corresponding process 335. As described in relation to FIGS. 4 and 6, GAIs 346 and GMIs 347 enable processes 335 to operate in a distributed and synchronized manner.

Figure 4:
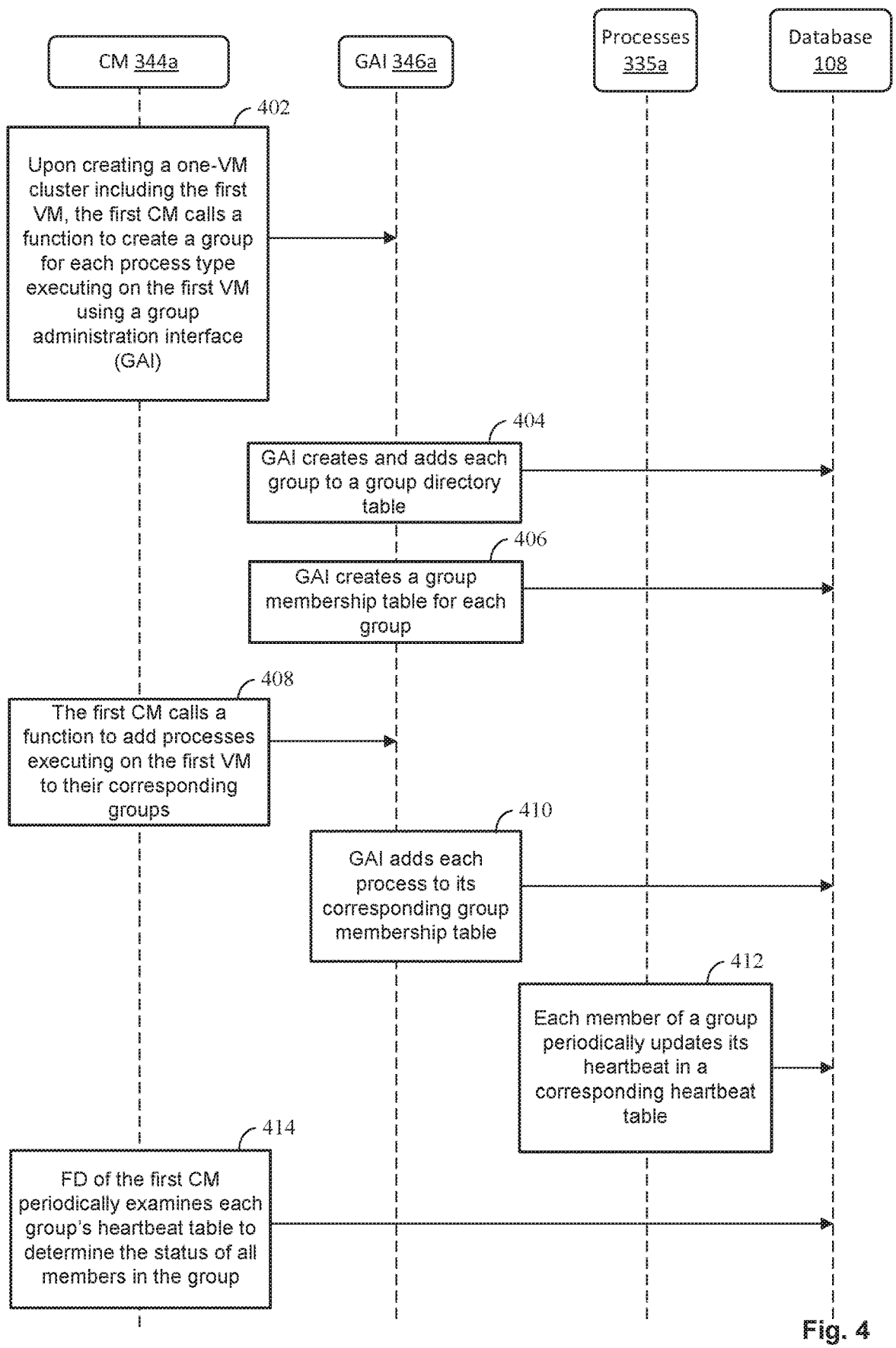
FIG. 4 illustrates example cluster configuration operations performed by one or more components shown in FIG. 3, according to certain aspects described herein.

FIG. 4 illustrates example cluster configuration operations 400 described herein with reference to a first VM, having a first CM. In the example of FIG. 4, the first VM refers to VM 125a and the first CM refers to 344a of FIG. 3.

At block 402, upon creating a one-VM cluster including the first VM, the first CM calls a function to create a group for each process type executing on the first VM using a GAI that is executing on the first CM. For example, upon creating a one-VM cluster including VM 125a, CM 344a calls a function to create a group for each process executing on VM 125a. More specifically, when VM 125a first boots up, CM 344a is configured to first identify processes 335a and their types. For example, CM 344a determines that processes 335a include an MP, a controller, and a policy, which are shown in FIG. 3 as MP 241a, controller 242a, and policy 243a, respectively. In this example, there are three types of processes, for each of which CM 344a calls a function to create a group. The groups, in this example, include a an MP group, a controller group, and a policy group. Note that a group is not created for DBS 240a. U.S. application Ser. No. 16/255,768, filed on Jan. 23, 2019, provides additional details of how CM 344a creates a database cluster configuration for clustering DBS 240a together with additional DBSs, such as DBS 240b, for operating database 108 as a distributed and highly consistent database. U.S. application Ser. No. 16/255,768 is hereby incorporated by reference in its entirety.

In certain aspects, CM 344a identifies processes 335a based on the type of VM 125a. For example, in such aspects, if VM 125a is a unified appliance, then CM 344a is configured to determine that processes 335a include an MP, a controller, and/or a policy, which are shown in FIG. 3 as MP 241a, controller 242a, and policy 243a, respectively. In other examples (not shown in FIG. 3), if a VM is a manager appliance, it may only include an MP and a policy and if the VM is a controller appliance, it may only include a controller. In certain aspects, CM 344a is able to determine the type of VM 125a based on a file that is created and written to the local storage associated with VM 125a during the instantiation of VM 125a. In such aspects, the file indicates the type of VM 125a. In certain other aspects, after VM 125a is instantiated, processes 335a are configured to register themselves with CM 344a, thereby, enabling CM 344a to identify processes 335a.

The function used by CM 344a for creating groups may be referred to as a "createGroup" function, which is provided by GAI 346a to trigger GAI 346a to create a group. For example, CM 344a calls the createGroup function to create a MP group. In such an example, the parameters that CM 344a may use when calling the function may include a unique group name associated with the MP group as well as the type of the MP group.

At block 404, the GAI executing on the first CM creates and adds each group to a group directory table. In certain aspects, when GAI 346a first starts executing, it creates and stores a group directory table in database 108 through DBS 240a. The group directory table, shown in FIG. 5, is configured to store a list of all the created groups. Therefore, in response to CM 344a calling the "createGroup" function for a certain group, GAI 346a creates the group and adds it as a member to the group directory table. Creating a group includes GAI 346a generating a group identifier for the group based on the parameters received from CM 344a. Also, adding a group to the group directory table includes GAI 346a adding a row to the group directory table that includes the group's identifier and name.

FIG. 5 shows an example group directory table 510, which has a first row storing a group identifier "UUID 1" and a group name "MP Group" associated with a MP group, including MP 240a. Group directory table 510 also has a second row storing a group identifier "UUID 2" and a group name "Controller Group" associated with a controller group, including controller 242a. Although not shown, group directory table 510 also comprises a third row associated with a policy group.

In certain aspects, instead of creating and storing a group directory table when GAI 346a first starts executing, GAI 346a may create a group directory table in response to the first time CM 346a calls the createGroup function for creating a group.

At block 406, the GAI executing on the first CM creates a group membership table for each group in the group directory table. For example, GAI 346a creates a group membership table for each of the MP, controller, and policy groups of the group directory table in FIG. 5. GAI 346a stores these group membership tables in database 108, through DBS 240a. FIG. 5 shows an example group membership table 520 for group UUID 1, which corresponds to the MP group. As shown, group membership table 520 has three columns including a member identifier column, a member name column, and a status column. Although not shown, a group membership table is also created for each of the MP, controller, and policy groups.

At block 408, the first CM calls a function to add processes executing on the first VM to their corresponding groups. For example, CM 344a calls a function, which may be referred to as an "addMember" function, provided by GAI 346a that triggers GAI 346 to add processes 335a to their corresponding group membership tables. As an example, CM 344a calls the addMember function to add MP 241a to the MP group. In such an example, the parameters that CM 344a may use when calling the addMember function may include a member UUID associated with MP 241a as well as a user-recognizable name for the process (e.g., the process's fully qualified domain name (FQDN)). CM 344a similarly calls the addMember function for adding the other processes, including controller 242a and policy 243a, to their corresponding groups.

At block 410, the GAI executing on the first CM adds each process to its corresponding group membership table. For example, when CM 344a calls the addMember function to add MP 241a to the MP group, GAI adds a row for MP 241a to group membership table 520. As illustrated, the first row in group membership table 520 includes MP 241a's UUID, shown as member UUID 1, and the MP 241a's name, shown as FQDN 1. Note that a process that is part of a group, is referred to as a group member or member. Each member is identified by its UUID, which does not change across restarts. The first row in group membership table 520 also includes MP 241a's status, which is shown as "up." A member's status in a group membership table indicates whether the process is operational. For example, an "up" status indicates that the process is operational and a "down" status indicates that the process has failed or is non-operational.

In addition to MP 241a, CM 344a also adds controller 242a and policy 243a to a controller group membership table and a policy group membership table, respectively. Further, for each group, GAI 346a creates a corresponding heartbeat table that indicates the presence of each member of the group. More specifically, once a process is added to a corresponding group's membership table, the process is configured to periodically update its heartbeat in the group's heartbeat table to announce or report its presence. As further described below, by examining the group's heartbeat table, fault detectors 345 are then able to determine which members of the group are operational for workload sharing purposes. Based on that determination, fault detectors 345 are configured to update each member's status in the group membership tables.

FIG. 5 illustrates an example of a heartbeat table created and stored in database 108 for the MP group. Heartbeat table 530 has three columns including a member identifier, a heartbeat version, and a heartbeat count. The member identifier column includes a unique member identifier for MP 241a, which is shown as member UUID 1. The heartbeat version is a monolithically increasing number that is incremented only when MP 241a restarts. Heartbeat table 530 also includes a heartbeat count, whose change on a periodic basis indicates that MP 241a is operational. When heartbeat table 530 is first created, the heartbeat version and the heartbeat count are both set to zero. In the example of FIG. 5, MP 241a' heartbeat version is "1," which indicates that MP 241a has been restarted once. Note that, as described below, the value indicated by a heartbeat count is not significant. It is the periodic change, or a lack thereof, of the heartbeat count that indicates whether MP 241a is operational or not. The heartbeat count is reset to zero when MP 241a restarts. Note that a heartbeat table may be referred to as storing availability information (e.g., heartbeat count) corresponding to each member that is part of the heartbeat table.

Referring back to FIG. 4, at 412, each member of a group updates its heartbeat count in a corresponding heartbeat table. For example, MP 241a is configured to periodically update its heartbeat count in heartbeat table 530. MP 241a is able to update its heartbeat count through GMI 347a. For example, when MP 241a is added to the MP group's membership table, it calls a function (e.g., a "join" function), provided by GMI 347a, that triggers GMI 347a to start a number of background threads, including a background thread that provides updates of the MP 241a's status in the heartbeat table. More specifically, the background thread sets and updates MP 241a's heartbeat version and heartbeat count.

For example, once the function is called, GMI 347a sets and updates MP 241a's heartbeat version each time MP 241a restarts. In addition, GMI 347a begins to set and periodically update the heartbeat count for MP 241a. For example, GMI 347a may increment the heartbeat count every five seconds by "1." Similarly, GMIs 347 of each of controller 242a and policy 243a are also configured to periodically update the processes' heartbeats in their corresponding heartbeat tables.

In addition to the background thread that updates the status of MP 241a, another background thread notifies MP 241a of the status of any other members in the MP group. For instance, in an example where MP 241b joins the MP group, as described in relation to FIG. 6, the background thread notifies MP 241a of any changes in the status of MP 241b and vice versa. More specifically, in such an example, MP 241a gets notified when the status of MP 241b changes from "up" to "down," and vice versa.

Note that a member may leave a group and become inactive in certain cases. In such cases, all background threads associated with that member cease to operate. For example, the background threads stop updating the member's heartbeat count or notifying the member of changes in the status of other members. In such cases, because the inactive member's heartbeat is not updated, the member may be considered non-operational by fault detectors 345, as described below. However, the inactive member may continue to be a configured member of its corresponding group. In addition to the background threads described above, one or more other background threads may perform additional services, such as leadership lease monitoring, for each process 335 as well.

At 414, the first CM's fault detector periodically examines each group's heartbeat table to determine the status of all members in the group. For example, fault detector 345a is configured to periodically examine heartbeat table 530 to determine the status of MP 241a. Fault detector 345a maintains a limited local history of heartbeats of all members of heartbeat table 530, which in the described example only includes MP 241a at this point. If a member has updated its heartbeat count more than a minimum number of times in the last fault detection period, the member's status is considered to be operational, otherwise, the member is considered to be non-operational or have failed. When calculating a member's status, in order to account for any restarts of the member, a fault detector 345 may only consider the heartbeat count associated with the member's latest heartbeat version.

A fault detection period refers to a certain period of time during which the heartbeat counts of members of a group are examined. Once one fault detection period ends, a fault detector 345 resets its count of how many times a member's heartbeat count changed during the expired fault detection period and starts a new fault detection period. Once the new fault detection period starts, the fault detector 345 starts a new count of the member's heartbeat to determine whether the member's heartbeat count is updated more than the minimum number of times in the new or last fault detection period.

After the last fault detection period ends, the status of each member may be updated in the member's corresponding group membership table to "up" or "down," based on the member's heartbeat count. In certain aspects, a member's status is changed only if a quorum of fault detectors 345 agrees on the new status, such that all fault detectors 345 in the quorum indicate the same new status. A quorum may be defined to correspond to a certain number, portion, or percentage of fault detectors 345. For example, a member's status may be changed only if at least two thirds or 66% of fault detectors 345 agree on the new status. Using a quorum for such changes is advantageous because it prevents a certain fault detector 345 with a faster CPU clock rate from unilaterally changing the status of one or more members.

In the example of FIGS. 4-5, since only one VM 125a has joined the cluster at this point, only one fault detector 345a is operational. In that case, fault detector 345a may be able to unilaterally change the status of members in their corresponding group membership tables because the quorum requirement is met (i.e., 100% of the fault detectors are present now). In certain aspects, a quorum may be required only if there is more than a certain number of fault detectors 345 in the cluster.

Once VM 125a is clustered, one or more additional VMs 125 are added to the one-VM cluster of VM 125a. For example, VM 125b may be added to VM 125a to create a two-VM cluster. In such an example, CM 344b of VM 125b may receive a command, for example, from an administrator for VM 125b to join VM 125a's cluster. Based on that command, CM 344b transmits a request to CM 344a to join the one-VM cluster. Subsequently, CM 344a and CM 344b engage in a certain set of cluster configuration operations, which result in VM 125b joining VM 125a's cluster. Note that the details of such cluster configuration operations are described in U.S. application Ser. No. 16/255,768, filed on Jan. 23, 2019. As part of the operations performed for adding VM 125b to VM 125a's cluster, CM 344b is configured to add processes 335b to their corresponding groups, which were previously created by CM 344a, including the MP, the controller, and the policy groups.

Figure 6:
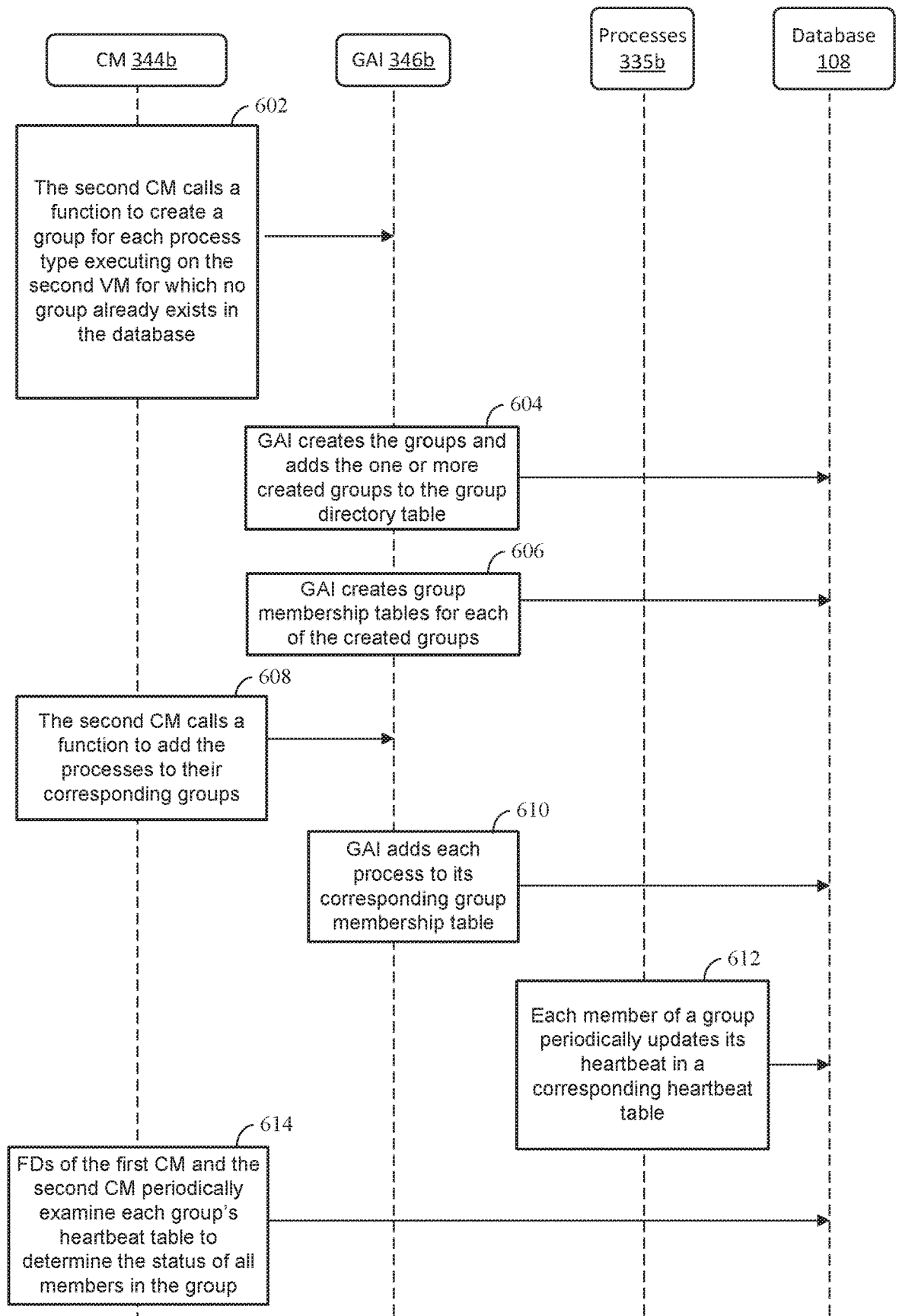
FIG. 6 illustrates example cluster configuration operations performed by one or more components shown in FIG. 3, according to certain aspects described herein.

FIG. 6 illustrates example cluster configuration operations 600 described herein with reference to a first VM, having a first CM, and a second VM, having a second CM. In the example of FIG. 6, the first VM refers to VM 125a, the first CM refers to 344a, the second VM refers to VM 125a, and the second CM refers to CM 344b. In certain aspects, operations 600 are performed after CM 344b initiates a set of cluster configuration operations to synchronize VM 125b with a cluster configuration associated with a two-VM cluster that includes VM 125a and VM 125b.

At block 602, the second CM calls a function to create a group for each process type executing on the second VM for which no group already exists in the database. For example, as part of certain operations performed for adding VM 125b to VM 125a's cluster, CM 344b calls the createGroup function for any process type associated with processes 335b for which no group already exists in database 108. More specifically, CM 344b first determines the process types associated with processes 335. Next, CM 344b examines database 108, based on which, CM 344b determines that group directory table 510 already stores an MP group, a controller group, and a policy group. As such, CM 344a concludes that there is a group for every type of process associated with processes 335b. As such, in this example, CM 344b does not call the createGroup function to create any groups.

However, in other examples, processes 335b may include a process type for which a group cannot be found in group directory table 510. In such an example, CM 344b calls the createGroup function to trigger GAI 346b to create the group. In response, at blocks 604 and 606, GAI 346b creates the group, adds it to group directory table 510, and then creates a group membership table for the created group. Blocks 604 and 606 are performed similarly to blocks 404 and 406 of operations 400.

At block 608, the second CM calls a function to add processes executing on the second VM to their corresponding groups. For example, CM 344b calls the addMember function to add each of processes 335b to its corresponding group.

At block 610, GAI 346b adds each process to its corresponding group membership table. For example, GAI 346b adds MP 241b to group membership table 520, as shown in FIG. 7. Group membership table 520 shows member UUID 1, which corresponds to MP 241a, and member UUID 2, which corresponds to MP 241b. Similarly, GAI 346b adds controller 242b, and policy 243b to their corresponding group membership tables (not shown). Note that at this point in the current example, each group has a corresponding heartbeat table. If, at blocks 602-604, a new group is created, GAI 346a creates a corresponding heartbeat table for the newly created group as well.

At block 612, each member of a group periodically updates its heartbeat count in a corresponding heartbeat table. For example, MP 241a and MP 241b are configured to periodically increment their heartbeat counts in heartbeat table 530. The rest of processes 335a and 335b also similarly update their heartbeat counts in their corresponding heartbeat tables.

At 614, the fault detectors of the first and the second CM periodically examine each group's heartbeat table to determine the status of all members in the group. For example, fault detectors 345a and 345b examine heartbeat counts of member UUID 1 and member UUID 2 in heartbeat table 530. Note that all fault detectors 345 in a certain cluster are able to access all the tables, including the heartbeat tables, associated with the cluster because the tables are all stored in the shared database 108.

As described above, fault detectors 345a and 345b may update the status of a member depending on whether the member has updated its heartbeat count more than a minimum number of times in the last fault detection period. In aspects where a quorum requirement is enforced, a member's status is changed only if a quorum of fault detectors 345a and 345b agrees on the new status. For example, if both fault detector 345a and 345b indicate that member UUID 1 has not updated its heartbeat count a minimum number of times during the last fault detection period, member UUID 1's status may be changed to "down," as shown in group membership table 520.

Once member UUID 1's status is changed to "down," a background thread associated with member UUID 2 notifies member UUID 2 that member UUID 1's status changed, as described above. Based on the notification, member UUID 2 is able to determine that member UUID 2 is the only operational instance associated with management plane 105 and may, therefore, handle all the workload associated with database 108 until member UUID 1 becomes available again. When member UUID 1 becomes available again and fault detectors 335a and 335b agree to change its status to "up," member UUID 2 is notified of the change again. This notification enables member UUID 2 to start sharing workload with member UUID 1 again.

Similar to operations 600, additional operations may be performed for adding additional VMs 125 to the two-VM cluster, including VM 125*a* and VM 125*b*. In such cases, processes associated with the additional VMs are similarly grouped and added to the tables stored in database 108. New groups and corresponding tables may also be created if the additional VMs execute types of processes for which no groups are stored in database 108.

Utilizing the aspects described herein, the status of each member of a cluster or group of processes may be monitored and shared with other members of the group with the use of a strongly consistent database 108. More specifically, using the GMI, each member is able to efficiently share its presence or status with other members or be notified of any change in the status of other members by conveniently accessing the tables stored in database 108. Without the use of the techniques described herein, each member may have to be configured to directly notify or broadcast to each other member its presence and status information, which requires the use of more compute cycles and data transmission over network 165.

As described above, GMIs 347 provide leader election services to processes 335. For example, each process 335 is able to request the leadership of a service by calling a function, referred to as requestLeadership, relinquish the leadership of a service by calling a function, referred to as rellinquishLeadership, and check the leadership status of a certain service by calling a function, referred to as isLeader. As service or a task is an activity that that a group member is configured to perform. A group member may request leadership of a certain service because the service may be configured to be performed by only one member.

A group member can request to be the leader of a service at any time. Also, leadership of a service is lease-based. This means that when a member of a group acquires a leadership lease for a certain service, no other members would be able to acquire the leadership of the service until the leadership lease of the leader expires. Each lease is valid for a defined period of time, referred to as a lease period, after which the lease expires. A leadership lease is acquired when it is written to a lease table stored in database 108. An example of a lease table is shown in FIG. 8. Lease table 810 comprises four columns, including a service name, a leader identifier, a lease version, and a revocation count. The service name identifies the name of the service, the leader identifier indicates the member UUID of the leader, lease version indicates the number of times a lease has been renewed, and the revocation count indicates the number of group members that have indicated the lease is expired.

Once a member writes a lease for a service to a lease table, no other members are able to acquire the lease until the lease expires. Also, a leader may renew its lease before the lease expires. When a lease is renewed, its corresponding lease version is incremented in the lease table. In certain aspects, there is no limit on the number of times a lease can be renewed. To relinquish a lease, a leader may delete the lease from the lease table or allow the lease period to expire without renewing the lease. If a leader allows its lease to expire, the lease is eventually revoked by the other group members. Similarly, if a lease is not timely renewed, the lease is considered as expired and is revoked by the other group members. For example, if a lease is held beyond the lease period the leader may be assumed to be non-operational.

In certain aspects, a lease can only be revoked when a quorum of group members all indicate that the lease has expired. Enforcing a quorum requirement ensures that a single member with a faster CPU clock rate does not prematurely revoke valid leadership lease. Each group member increments the revocation count of a lease in the lease table when it considers the lease to be expired. The lease is revoked when the revocation count reaches a configured threshold corresponding to the quorum. Leadership for a service is revoked by deleting the lease for the service from the lease table.

Figure 9:
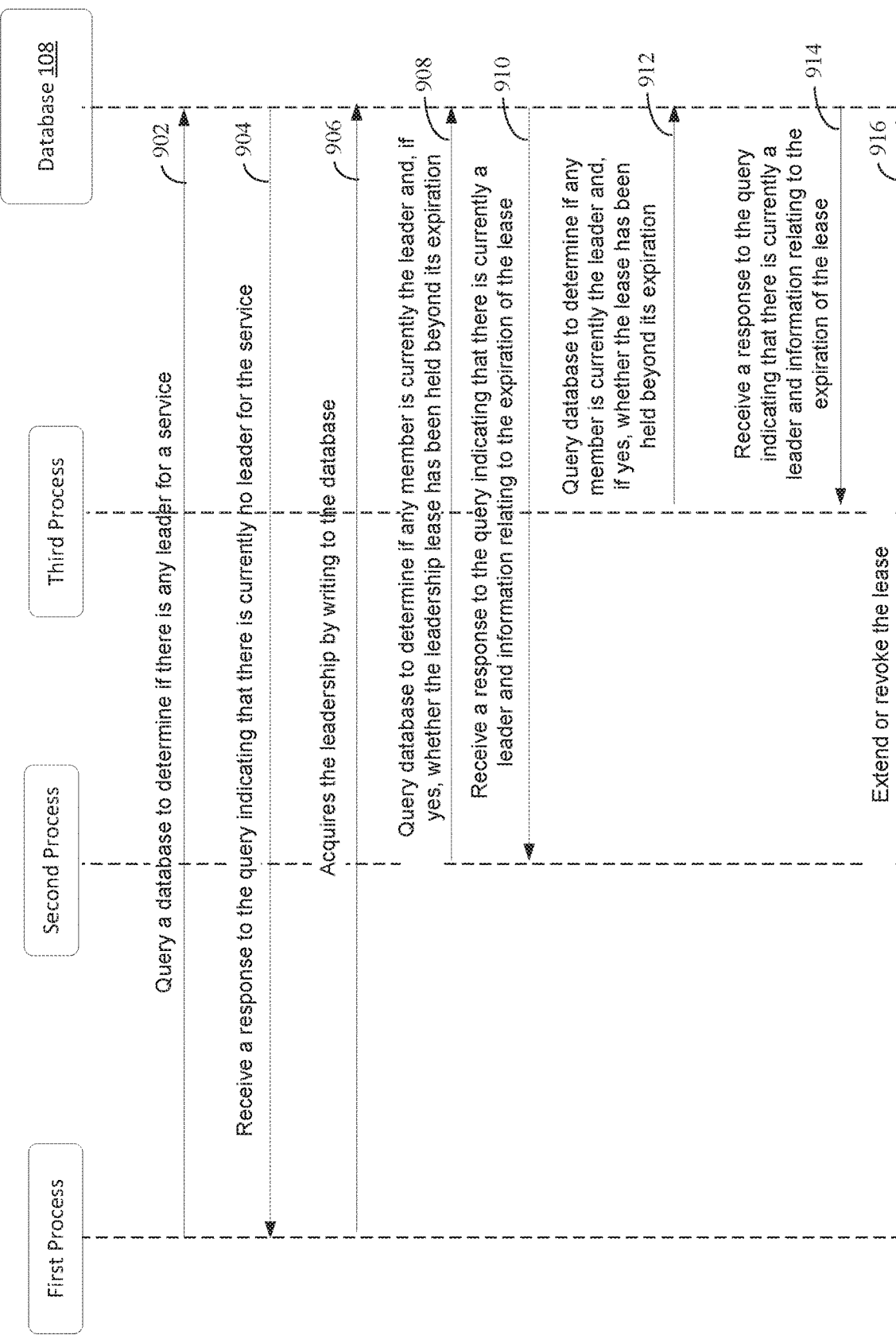
FIG. 9 illustrates example leader election operations, according to certain aspects described herein.

FIG. 9 illustrates example leader election operations 900 performed by GMIs 347 of three different processes, including a first process, a second process, and a third process. In the example of FIG. 9, the three processes refer to three processes in, for example, the MP group. In such an example, the first process refers to MP 241*a*, the second process refers to MP 241*b*, and the third process refers to MP 241*c*.

At block 902, the first process queries the database to determine if there is any leader for a certain service of a distributed application. For example, MP 241*a* calls the isLeader function to determine whether there is currently any leader for a certain MP-related service. When the isLeader function is called, GMI 347*a* queries the lease table associated with the MP group that is stored in database 108 to determine whether a lease has been written to the lease table for the service.

At block 904, the first process receives a response to the query from the database indicating that there is currently no leader for the service. For example, GMI 347*a* queries the lease table and receives a response from database 108 indicating that a lease has not been written to the lease table for the service.

At block 906, the first process acquires the leadership of the service by writing to the lease table. For example, MP 241*a* calls the requestLeadership function, in response to which GMI 347*a* adds a row to the lease table that indicates the service whose leadership MP 241*a* has requested, the member identifier, the lease version, and the revocation count.

At block 908, while the leadership of the service is held by the first process, a second process queries the database to determine if any entity is currently the leader and, if yes, whether the leadership lease has been held beyond its expiration. For example, MP 240*b* calls the isLeader function, in response to which GMI 347*d* queries lease table 810.

At block 910, the second process receives a response to the query indicating that there is currently a leader and information relating to the expiration of the lease. For example, in response to GMI 347*d*'s query, GMI 347*d* determines that the leadership for the service is being held by MP 241*a*. The isLeader function also returns information regarding whether the current lease has expired. For example, the isLeader function periodically examines the lease version to determine if it has changed. If the lease version does not change after the lease period is over, then MP 241*b* determines that the lease has expired and increments the revocation count associated with the lease.

Blocks 912 and 914 are performed by a third process, such as MP 241*c*, similar to blocks 908 and 910.

At block 916, before the lease period ends, the first process either extends or revokes the lease. If the first process extends the lease, the lease version is incremented in the lease table. If the lease is revoked, the lease is deleted from the lease table. In certain aspects, the first process may neither extend nor revoke the lease, in which case the first and/or the second process may eventually determine that the lease has expired and revoke the lease.

In certain aspects, the first process may be configured to renew the lease at least a certain period of time prior to the end of the lease period. This ensures that the first process renews the lease on-time and, thereby, does not fail to renew the process before the lease period ends. For example, if the lease period is 30 seconds, a leader may be configured to renew the lease no longer than 25 seconds into the lease period. That way the second or the third processes are able to determine that the lease has been renewed before the lease period is over. Otherwise, if the first process starts to renew its lease exactly at 30 seconds into the lease, the second or third processes may examine the lease table at the end of the 30 second lease period and determine the lease has not been renewed, based on which the second or third processes may consider the lease to be revoked and take leadership of the service. In certain aspects, the non-leader processes may also be configured to observe a grace period before considering a lease to be revoked. For example, if the lease period is 30 seconds, the second and third processes may be configured to consider the lease to be revoked if the first process has not renewed the lease 35 seconds after the lease started. In other words, the non-leader processes in these examples would be giving the leader a 5 second grace period. These techniques safeguard against two processes taking leadership of a service at the same time.

Figure 10:
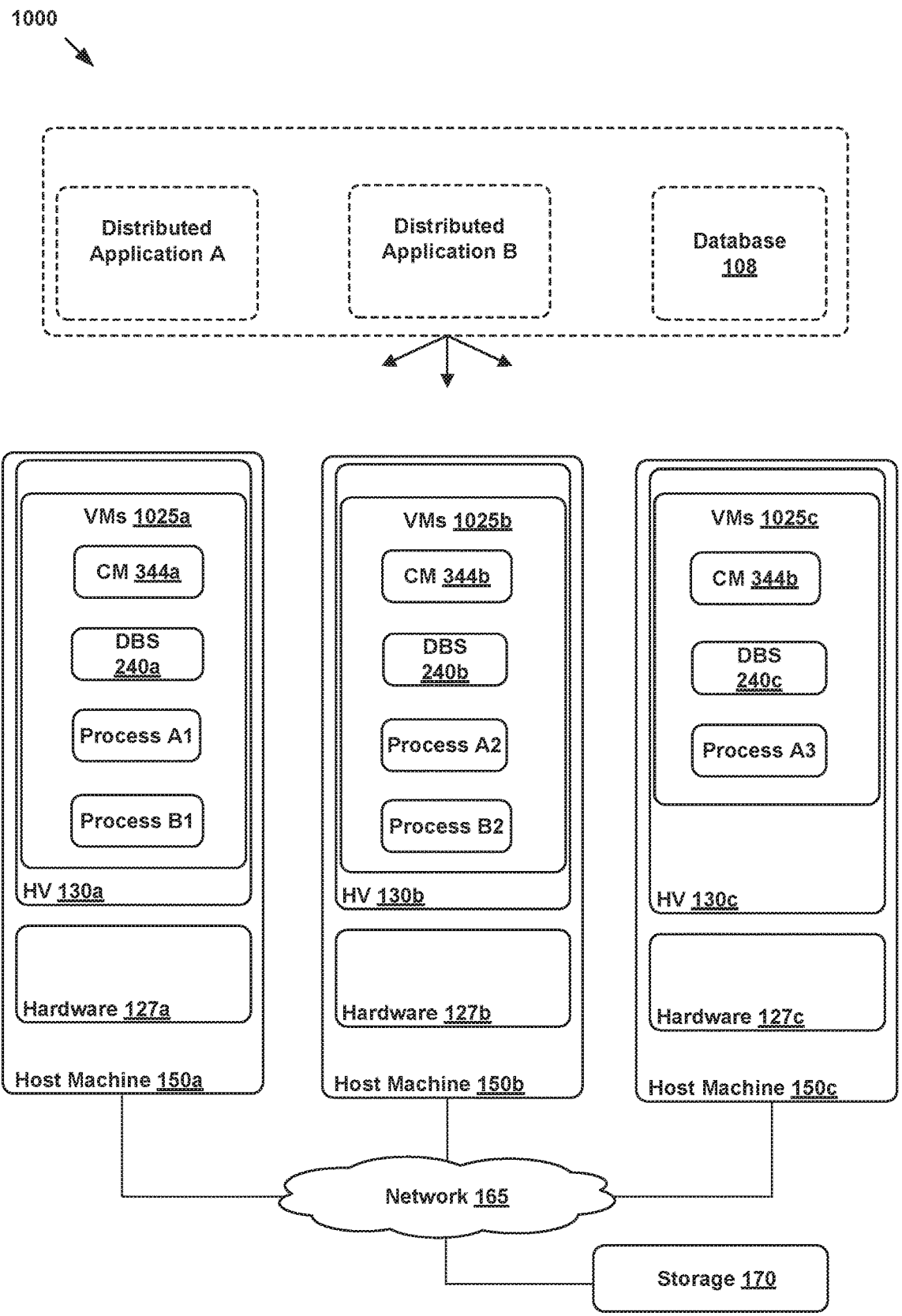
FIG. 10 illustrates an example system where the aspects described herein may be implemented, according to certain aspects described herein.

FIG. 10 illustrates another example system 1000 including distributed application A, distributed application B, and distributed database 108. Processes A1, A2, and A3 are configured to implement the functions of distributed application A. Processes B1 and B2 are configured to implement the functions of distributed application B. In system 1000, CMs 344a-344c as well as processes of the distributed applications are configured to perform a set of cluster configuration operations, similar to operations 400, 600, and 900, to provide the processes with group management and leader election coordination.

Figure 11:
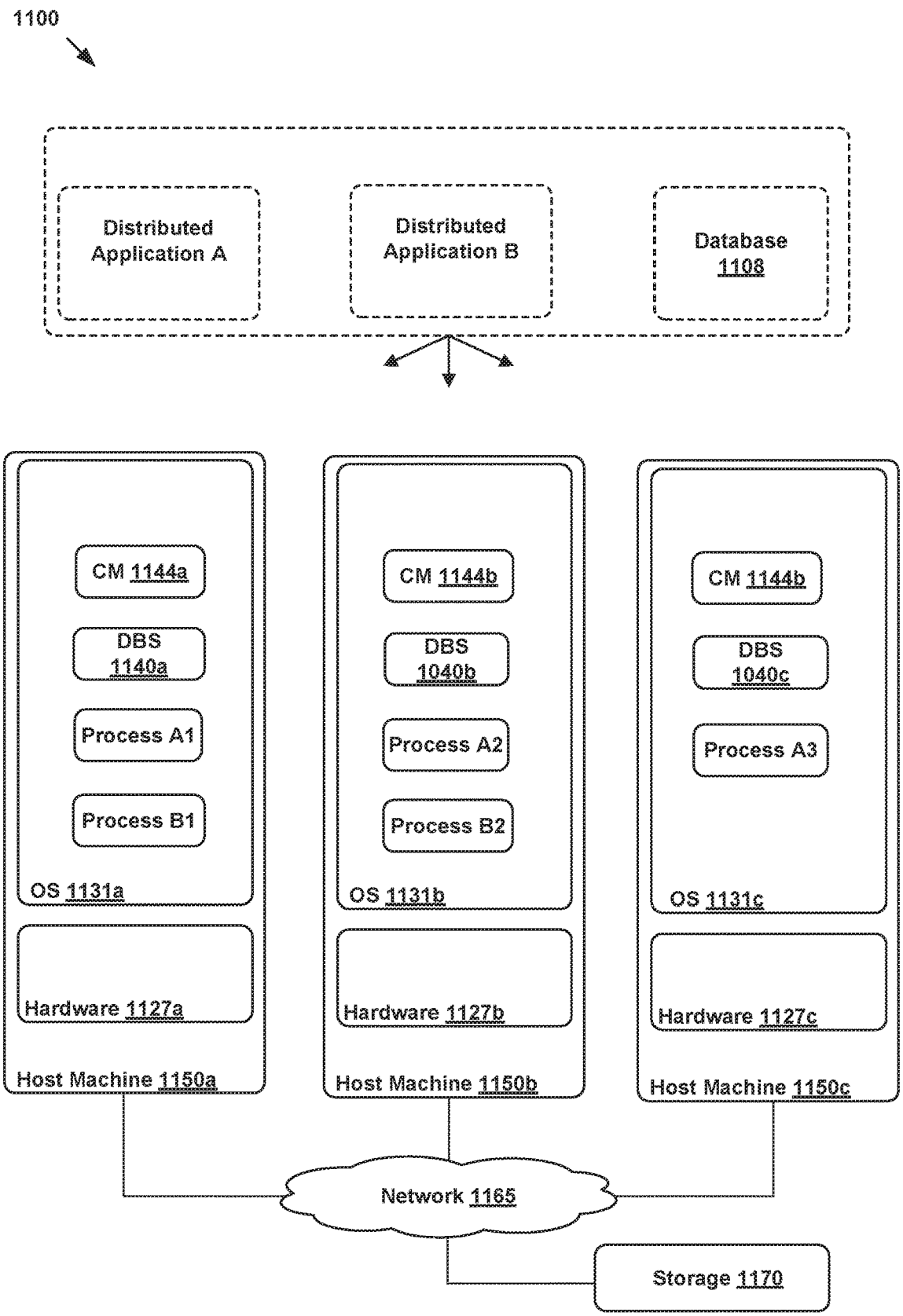
FIG. 11 illustrates an example system where the aspects described herein may be implemented, according to certain aspects described herein.

FIG. 11 illustrates another example system 1100 including distributed application A, distributed application B, and distributed database 1108. In system 1100, processes associated with the distributed applications as well as CMs 1144 are executing in the user space of operating systems 1131 of physical machines 1150 (e.g., similar to host machine 150). Processes A1, A2, and A3 are configured to implement the functions of distributed application A. Processes B1 and B2 are configured to implement the functions of distributed application B. In system 1100, CMs 1144a-1144c and processes of the distributed application are configured to perform a set of cluster configuration operations, similar to operations 400, 600, and 900, to provide group management and leader election coordination to the processes. Note that host machines 1150 of FIG. 11 are similar to host machines 150 of FIG. 1 and include hardware components 1127 that are also similar to hardware components 127 of FIG. 1. Further, network 1165 and storage 1170 are similar to network 165 and storage 170 of FIG. 1.

Certain aspects as described above involve a hardware abstraction layer on top of a host computer. The hardware abstraction layer allows multiple contexts or virtual computing instances to share the hardware resource. In one aspect, these virtual computing instances are isolated from each other, each having at least a user application running therein. The hardware abstraction layer thus provides benefits of resource isolation and allocation among the virtual computing instances. In the foregoing aspects, virtual machines are used as an example for the virtual computing instances and hypervisors as an example for the hardware abstraction layer. As described above, each virtual machine includes a guest operating system in which at least one application runs. It should be noted that these aspects may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various aspects described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more aspects of the invention may be useful machine operations. In addition, one or more aspects of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various aspects described herein may be practiced with other computer system configurations including handheld devices, microprocessor systems, microprocessor-based or programmable consumer electronics, minicomputers, mainframe computers, and the like.

One or more aspects of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more aspects of the present invention have been described in some detail for clarity of understanding, it will be apparent that certain changes and modifications may be made within the scope of the claims. Accordingly, the described aspects are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various aspects may be implemented as hosted aspects, non-hosted aspects or as aspects that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of updating a status of a first process executable in a first node, the method comprising:
   periodically examining a first table stored in a consistent and distributed database, wherein:
      the first table includes a first indication of a status of the first process and a second indication of a status of a second process, and
      the first process and the second process are executable instances of a distributed application,
   determining that the first indication has not changed during a first time period;
   changing a third indication of the status of the first process in a second table to reflect that the first process is non-operational based on the first indication having not changed during the first time period, wherein:
      the second table is stored in the database,
      the second process is notified by the third indication being changed in the second table, and
      a different share of workload associated with the distributed application is performed by the second process after the second process is notified as compared to when the first process was operational;
   periodically examining the first table to determine whether the first indication has changed during a second time period;
   determining that the first indication has changed during the second time period; and
   changing the status of the first process in the second table to reflect that the first process is operational.

2. The method of claim 1, wherein the determining that the first indication has not changed during the first time period is performed by the first node and the second process executes in a second node.

3. The method of claim 2, wherein changing the second indication of the status of the first process comprises changing the second indication of the status of the first process only if the second node also determines that the first indication has not changed during the first time period.

4. The method of claim 1, wherein:
   the first table includes a heartbeat version associated with the first process, and
   the first indication comprises a heartbeat count.

5. The method of claim 1, wherein the second process is notified by a background thread that is configured to periodically access the second table in the database.

6. The method of claim 1, wherein the first process and the second process are configured to periodically change the first indication and the second indication, respectively, when the first process and the second process are operational.

7. The method of claim 1,
   wherein the second time period is earlier than the first time period.

8. The method of claim 1,
   wherein the second time period is later than the first time period.

9. The method of claim 1, further comprising:
   querying, at the first process, a lease table stored in the database to determine if the lease table indicates that the distributed application has a leader; and
   upon determining that the distributed application does not have a leader, acquiring, at the first process, leadership of the distributed application by writing a lease to the lease table for the distributed application, wherein:
      the lease is valid for a lease period starting from when the lease is written to the lease table,
      the second process periodically examines the lease table during the lease period, and
      the second process is not able to acquire the leadership for a time period corresponding to a duration of the lease period plus a duration of a grace period.

10. A first apparatus, comprising:
    a memory; and
    a processor coupled to the memory, the processor and the memory configured to:
    periodically examine a first table stored in a consistent and distributed database, wherein:
       the first table includes a first indication of a status of a first process and a second indication of a status of a second process, and
       the first process and the second process are executable instances of a distributed application,
    determine that the first indication has not changed during a first time period;
    change a third indication of the status of the first process in a second table to reflect that the first process is non-operational based on the first indication having not changed during the first time period, wherein:
       the second table is stored in the database,
       the second process is notified by the third indication being changed in the second table, and
       a different share of workload associated with the distributed application is performed by the second process after the second process is notified as compared to when the first process was operational;

periodically examine the first table to determine whether the first indication has changed during a second time period;

determine that the first indication has changed during the second time period; and change the status of the first process in the second table to reflect that the first process is operational.

11. The first apparatus of claim 10, wherein the first process executes in the first apparatus and the second process executes in a second apparatus.

12. The first apparatus of claim 11, wherein the processor and the memory being configured to change the second indication of the status of the first process comprises the processor and the memory being configured to change the second indication of the status of the first process only if the second apparatus also determines that the first indication has not changed during the first time period.

13. The first apparatus of claim 10, wherein:
the first table includes a heartbeat version associated with the first process, and
the first indication comprises a heartbeat count.

14. The first apparatus of claim 10, wherein the second process is notified by a background thread that is configured to periodically access the second table in the database.

15. The first apparatus of claim 10, wherein the first process and the second process are configured to periodically change the first indication and the second indication, respectively, when the first process and the second process are operational.

16. The first apparatus of claim 10, wherein the second time period is earlier than the first time period.

17. The first apparatus of claim 10, wherein the processor and the memory are further configured to:
query, at the first process, a lease table stored in the database to determine if the lease table indicates that the distributed application has a leader; and
upon determining that the distributed application does not have a leader, acquire, at the first process, leadership of the distributed application by writing a lease to the lease table for the distributed application, wherein:
the lease is valid for a lease period starting from when the lease is written to the lease table,
the second process periodically examines the lease table during the lease period, and
the second process is not able to acquire the leadership for a time period corresponding to a duration of the lease period plus a duration of a grace period.

18. A non-transitory computer readable medium having instructions stored thereon that, when executed by a first computer system, cause the first computer system to perform a method comprising:
periodically examining a first table stored in a consistent and distributed database, wherein:
the first table includes a first indication of a status of a first process and a second indication of a status of a second process, and
the first process and the second process are executable instances of a distributed application,
determining that the first indication has not changed during a first time period;
changing a third indication of the status of the first process in a second table to reflect that the first process is non-operational based on the first indication having not changed during the first time period, wherein:
the second table is stored in the database,
the second process is notified by the third indication being changed in the second table, and
a different share of workload associated with the distributed application is performed by the second process after the second process is notified as compared to when the first process was operational;
periodically examining the first table to determine whether the first indication has changed during a second time period;
determining that the first indication has changed during the second time period; and
changing the status of the first process in the second table to reflect that the first process is operational.

19. The non-transitory computer readable medium of claim 18, wherein the first process executes in the first computer system and the second process executes in a second computer system.

* * * * *